US005967011A

United States Patent [19]

Feldkamper et al.

[11] Patent Number: 5,967,011

[45] **Date of Patent: *Oct. 19, 1999**

[54] DEVICE FOR REMOVAL OF SLIPS FROM A CONTINUOUSLY TRANSPORTED SLIP WEB

[75] Inventors: Richard Feldkamper; Rüdiger Duwendag, both of Lengerich, Germany

[73] Assignee: Windmöller & Hölscher, Lengerich/Westf., Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/733,268

[22] Filed: Oct. 17, 1996

[30] Foreign Application Priority Data

Oct. 27, 1995 [DE] Germany .......................... 195 40 148

[51] Int. Cl.[6] .............................. B23D 25/12; B26D 7/06

[52] U.S. Cl. ................................ 83/343; 83/110; 83/155; 83/660; 225/100

[58] Field of Search ............................ 83/110, 155, 660, 83/349, 343; 225/100

[56] References Cited

U.S. PATENT DOCUMENTS

| | | | |
|---|---|---|---|
| 2,971,414 | 2/1961 | Owen | 83/110 |
| 3,835,754 | 9/1974 | Lewyckj | 83/349 |
| 3,871,257 | 3/1975 | Schmermund | 83/349 |
| 3,898,900 | 8/1975 | Schmermund | 83/349 |
| 4,184,392 | 1/1980 | Wood | 83/110 |
| 4,221,145 | 9/1980 | Shimizu et al. | 83/110 |
| 4,997,119 | 3/1991 | Meschi | 225/100 |
| 5,104,022 | 4/1992 | Nakamura et al. | 225/100 |
| 5,141,142 | 8/1992 | Ramsey | 225/100 |
| 5,199,341 | 4/1993 | Jones | 83/110 |
| 5,230,268 | 7/1993 | Richter | 83/155 |
| 5,461,954 | 10/1995 | Boriani et al. | 83/349 |
| 5,484,379 | 1/1996 | Stab | 83/155 |

FOREIGN PATENT DOCUMENTS 265 210 11/1949 Sweden .

*Primary Examiner*—M. Rachuba
*Assistant Examiner*—Sean Pryor
*Attorney, Agent, or Firm*—Evenson, McKeown, Edwards & Lenahan, PLLC

[57] ABSTRACT

A device for removal of slips from a continuously transported slip web is composed of an advancement roll pair which continuously advances and holds the slip web. A blade cylinder pushes a respective lead end of a slip into an open gripper of a gripper cylinder. A device is arranged between the advancement roll pair and the blade cylinder and provides transverse perforated lines. A rotating tear-off segment cooperates with the blade cylinder. In order to enable a simple and rapid adaptation to different slip formats, the advancement speed of the advancement rolls, the transverse perforating device and the angle of action of the tear-off segment are correspondingly changed relative to the blade cylinder.

2 Claims, 2 Drawing Sheets

DEVICE FOR REMOVAL OF SLIPS FROM A CONTINUOUSLY TRANSPORTED SLIP WEB

BACKGROUND OF THE INVENTION

1. Field of the Invention

This invention pertains to a device for removing slips of material paper, such as from a continuously transported slip web. The device has an advancement roll pair which continuously advances and holds the slip web. A blade cylinder includes a blade, which follows a path along a surface line. A respective lead end of a slip is pushed into an open gripper of a gripper cylinder. A device is arranged between the advancement roll pair and the blade cylinder for providing transverse perforations in the slip web. A rotating tear-off segment cooperates with the blade cylinder.

2. Description of Related Art

A device of this type is known from practical operation and will be described with the aid of FIG. 2. Such a device cannot be reset to different slip formats without considerable cost since, in order to do this, the distance from the device which carries out the transverse perforation to the cooperating rotating tear-off segments or to the gripper of the gripper cylinder, respectively, must be changed. Changing this distance is costly, since the drives of the advancement rolls and of the transverse perforating device must also be adjusted to the changed format.

That is why the purpose of this invention is to create a device of the aforementioned type which can be adapted to different slip formats simply, rapidly, and with limited structural cost.

SUMMARY OF THE INVENTION

This problem is solved, in accordance with the invention, for a device of the aforementioned type by providing the blade cylinder with two sleeve sections of larger and smaller radii. The tear-off segment cooperates with the sleeve section having a greater radius and rotates at the same peripheral speed as the latter. The diameter of the enveloping cylinder described by the tear-off segment is equal to the radius of the sleeve section having a greater radius. An angle at the circumference of the sleeve section having a smaller radius is large enough that the tear-off segment, when passing by the blade cylinder, alternately cooperates with the sleeve section having the greater radius and encounters the sleeve section having the smaller radius. The angle of action of the tear-off segment, relative to the blade cylinder, can be adjusted. The speed of the advancement rolls can be adjusted between a highest speed and a minimum speed. The highest speed is less than the peripheral speed of the blade cylinder and corresponds approximately to the speed required by the web start in order, during one rotation of the blade cylinder, to overcome the distance of the path between the perforating device up to the blade cooperating with the gripper. The minimum speed corresponds approximately to the speed which the web start requires in order, during one rotation of the cutter cylinder, to overcome the distance of the path between the perforating device up to the contact point of the tear-off segment on the blade cylinder. A hugger belt is arranged at the section of the periphery of the blade cylinder between the contact point of the blade with the gripper and the contact point of the tear-off segment with the blade and holds the slip web against the blade cylinder with a sliding contact prior to the separation of a slip from it. The slip is not entrained without slippage until after separation. The transverse perforating device can be adjusted to the web slips in such a way that it provides transverse perforations on the latter at intervals of the desired length of the slip. The angle of action of the tear-off segment is adjusted such that a tearing off of the slip is carried out when the blade is located precisely in the region of the front end of the web slips.

The device, in accordance with the invention, can be adjusted to different lengths of slips simply and rapidly since the advancement speed of the advancement rolls, the transverse perforating device and the angle of action of the tear-off segment can be correspondingly changed relative to the blade cylinder. A device in accordance with the invention can be used in order to tear slips from the slip web along transverse perforation lines. The greatest length of the slips corresponds approximately to the distance of the contact point of the blade of the blade cylinder in the opened grippers from the transverse perforating device. The shortest cut length of a slip is less than the length from the contact point of the tear-off segment at the blade cylinder up to the transverse perforating device.

After each slip is torn off, the front end of the slip web arrives in the gap between the carrier of the tear-off segment or hugger belt, respectively, and the blade cylinder. The front region of the slip web is then held in contact with the sleeve of the blade cylinder by the hugger belt. Both the sleeve of the blade cylinder and the hugger belt glide over the slip web with slippage, since the latter is advanced at only a limited speed. The perforating device provides the slip web with transverse perforations at desired intervals, with the tearing-off of a slip always being carried out when the transverse perforations are located between the contact point of the tear-off segment at the blade cylinder and the transverse perforating device. A tearing-off in this place is possible, since the tear-off segment and blade cylinder rotate at a greater peripheral speed than that which corresponds to the advancement speed of the web. In this connection, the adjustment is selected such that, in each case, at the time at which a tearing-off occurs, the blade of the blade cylinder is located under the front end region of the web. Consequently, a slip is entrained without slippage by the blade cylinder after being torn off, and the hugger belt and the blade introduce the front end of the slip, in correct position, into the open gripper.

Also, instead of a transverse perforating device, a device in accordance with the invention can be provided with a cutter which executes a transverse cut. Hence, a tear-off segment can be omitted with this configuration in accordance with the invention. For this device, in accordance with the invention, the time at which a removed slip is entrained can be determined solely by the execution of the transverse cut. Therefore, the transverse cut is to be carried out at the point when the blade of the blade cylinder is located in the front region of the slip web, such that a slip which has been removed is thereupon entrained by the blade cylinder without slippage and the front region of the slip can be introduced in the correct position into the gripper.

BRIEF DESCRIPTION OF THE DRAWINGS

An embodiment of the invention is explained in greater detail in the following section with the aid of the drawings.

DESCRIPTION OF THE PREFERRED EMBODIMENTS

Figure 2:
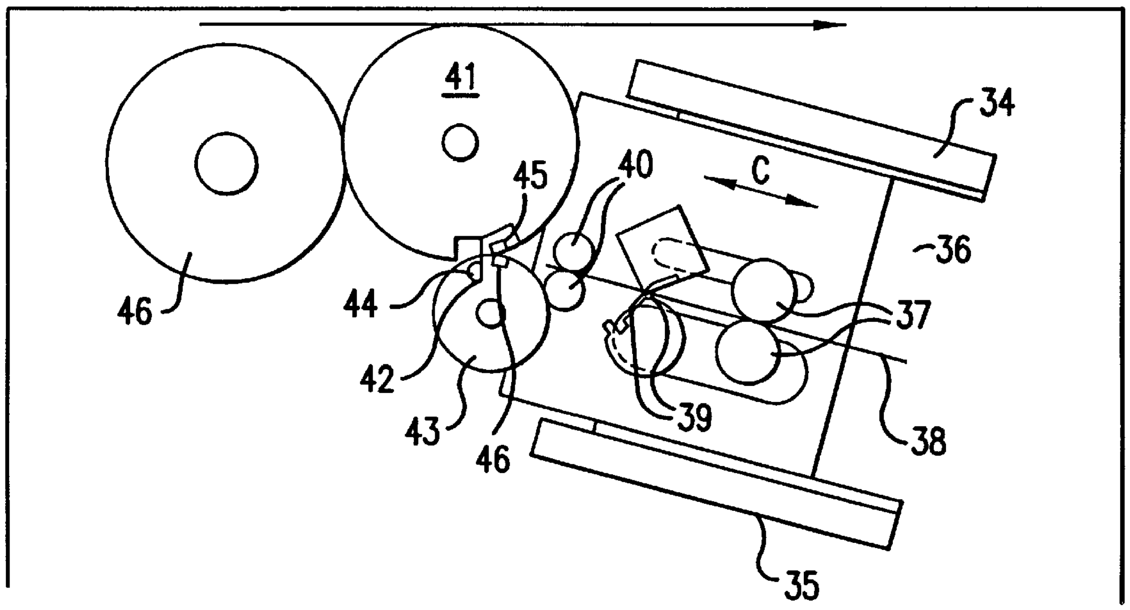
FIG.2 PRIOR ART
FIG. 2 is a schematic plan view of a known device which, during sack production, removes bottom cover sheets from a slip web in order to put adhesive onto and deposit the same onto the bottoms of sacks which have been pulled open.

For the known device, shown schematically in FIG. 2, advancement rolls (37), which advance a slip web (38) drawn from a supply reel, not shown, and hold it between themselves without slippage, are supported in a roll stand (36) which, in lateral guides (34,35), can be adjusted in the direction of double arrow C. This slip web is provided with transverse perforations by cooperating cutters (39). Advancement rolls (40) turn over the lead end of the slip web (38) to a gripper cylinder (41), into whose gripper (42) a blade (44) arranged on the blade cylinder (43) pushes the front end, respectively, of each slip for the purpose of a secure seizing of the same. The gripper cylinder (41) and the blade cylinder (43) are provided with cooperating tear-off segments (45,46) in which, in each case, slips taken over by the gripper cylinder (41) are torn off along the transverse perforation line provided by the cutters (39).

The gripper cylinder (41) cooperates with an adhesive-application roll (46) which provides a slip that has been torn off from the slip web (38) and the front end of which has been taken over by the gripper (42), with an adhesive deposit in accordance with a format. The gripper cylinder (41) thereupon presses the slip, e.g., a base cover sheet, to which adhesive has been deposited in accordance with the format, against workpieces, e.g., open sack bottoms, transported continuously in the direction of the arrow. The slips workpieces are then released by the gripper (42).

In order to change the format of a slip which has been removed from the slip web (38) it is necessary, for the known device evident from FIG. 2, to move the roll stand (36) in the direction of double arrow C. This, however, is extraordinarily laborious because the drive is adapted after each move.

Figure 1:
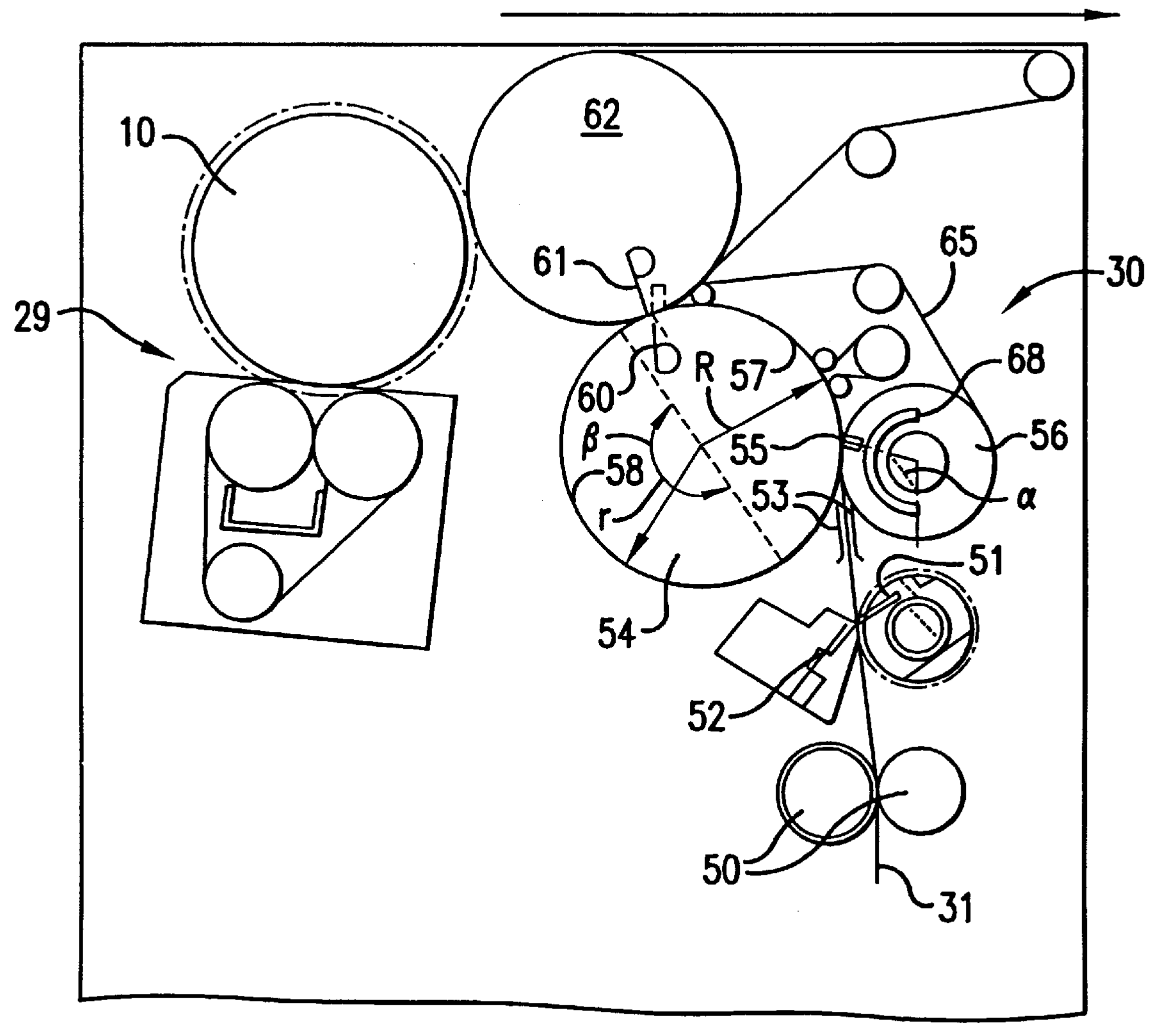
FIG. 1 is a schematic plan view of an adhesive-application device which, during sack production, cooperates with a device for tearing off base cover sheets from a slip web and depositing the same on the bottoms of sacks which have been pulled open.

In contrast, the device (30) for the removal of slips from a slip web and for the transfer of the slips to these workpieces to be completed, in accordance with the invention as seen from FIG. 1, can be changed to different formats much more simply and rapidly.

For the device in accordance with the invention, evident from FIG. 1, the slip web (31) is pulled up by the advancement and holding rolls (50). It is thereupon provided with transverse perforated lines by perforating cutters (51,52).

Once the slip web (31) has been provided with transverse perforated lines, the lead end of the slip web arrives, by cooperating guiding sheets (53), into the gap between the blade cylinder (54) and the tear-off cylinder (56) provided with a tear-off segment (55). Between the contact point of the blade (60) of the blade cylinder (54) in the open gripper (61) of the gripper cylinder (62) and the tear-off cylinder (56), the front region of the slip web (31) is pressed against the sleeve of the blade cylinder (54) by a hugger belt (65), which runs over regions of the tear-off cylinder and guide rolls. The hugger belt (65) can be composed of several continuous driving belts, revolving parallel to each other, and revolves at a speed which corresponds to the peripheral speed of the blade cylinder (54). The hugger belt (65) presses the front region of the slip web so strongly against the sleeve of the blade cylinder (54) that both the hugger belt as well as the sleeve of the blade cylinder (54) slide over the slip web, with slippage, so long as the latter is held by the advancement roll pair (50) which advances the slip web (31) at only a limited speed. Not until a tearing off occurs is a slip, which has been torn off, entrained without slippage.

The blade cylinder (54) is provided with two sleeve sections, namely, a sleeve section (57) having a greater radius R and a sleeve section (58) extending over a circumferential angle $\beta$ and having a smaller radius R, with the clamping force required for a tearing off being summoned up by the tear-off segment (55), only if the latter cooperates with the sleeve section (57), whereas the sleeve section (58) runs under the tear-off segment (55) without causing a clamping to occur. In order to guarantee that the tearing off of a slip is always carried out at the same angular position of the blade cylinder (54) for every format adjustment, the greater radius of the sleeve section (57) is equal to the diameter of the enveloping circle of the tear-off segment (55).

After a format change, in order to be able to undertake a tearing off of the slip in correct phase, the angle of action of the tear-off segment (55) can be adjusted relative to the tear-off cylinder (56), such that an angular tearing-off location on the blade cylinder (54) can be adjusted. The ability of the tear-off segment (55) to be adjusted relative to the tear-off cylinder (56) is indicated by the elongated hole (68) having a semicircular shape.

In order to be able to tear off a slip from the slip web (31) along the transverse perforated lines, the tear-off cylinder (56), along with the tear-off segment (55) and blade cylinder (54), revolves at a greater peripheral speed than the clamping and advancement rolls (50). A tearing off along a transverse perforated line is always carried out when a perforated section is located between the roll pair (50), the tear-off segment (55) located in the clamping position, and the blade (60) is located in the region of the front end of the slip web (31). During a tearing-off process, the perforating cutters (51,52), of course, must not act upon the slip web (31).

The respective leading end of a slip which has been torn off is pushed, by the blade (60) of the blade cylinder (54), into the open gripper (61) of the gripper cylinder (62). On the gripper cylinder (62), the slip is thereupon provided with an adhesive deposit by the adhesive-application roll (10) in accordance with the format, and thereupon pressed onto a workpiece, e.g., the bottom of a sack which has been drawn up, which is continuously transported in the direction of arrow B.

The adhesive-application roll (10) is part of a known adhesive-application device (29). In order to bring about a format change of slips to be torn off, it is merely required, for the device in accordance with the invention, to allow the advancement roll pair (50) to revolve at a faster or slower speed, such that different sized advance lengths of the slip web (31) can be pushed between the hugger belt (65) and the sleeve of the blade cylinder (54) up to the point of a tearing off. Naturally, the intervals of the transverse perforated lines and the angle of action of the tear-off segment (55) must be correspondingly adjusted, which can be carried out under computer control (not shown).

What is claimed is:

1. A device for removal of slips of material from a continuously transported slip web comprising:

an advancement roll pair which continuously advances and holds the slip web, a blade cylinder having a blade for pushing a respective lead end of a slip, a gripper cylinder having a gripper into which said respective lead end is pushed, a perforating device, arranged between the advancement roll pair and the blade cylinder, for providing transverse perforations in the slip web, and a rotating tear-off segment which cooperates with the blade cylinder, characterized in that the blade cylinder is provided with a first sleeve section having a greater radius and a second sleeve section having a smaller radius, the rotating tear-off segment cooperates with the sleeve section having said greater radius and rotates at the same peripheral speed as the sleeve section having said greater radius, and the diameter of a circle described by the rotating tear-off segment is equal to the greater radius, a circumferential angle of the blade cylinder over which the sleeve section having the smaller radius extends is great enough that the rotating tear-off segment, when passing by the blade cylinder, alternately cooperates with the sleeve section having the greater radius and encounters the sleeve section having the smaller radius, an angle of action of the tear-off segment relative to the blade cylinder is adjustable, a speed of the advancement roll pair is adjustable to accommodate slips of different lengths between a highest speed, which is less than a peripheral speed of the blade cylinder and corresponds approximately to a speed required by a web start in order, during one rotation of the blade cylinder, to overcome a first distance along a path traveled in the device by the slip web between the perforating device up to said blade, and a minimum speed, which corresponds approximately to the speed which the web start requires in order, during one rotation of the blade cylinder, to overcome a second distance along the path between the perforating device up to a contact point of the rotating tear-off segment on the blade cylinder, a hugger belt is arranged at a section of a periphery of the blade cylinder between the contact point of the blade with the gripper and the contact point of the rotating tear-off segment with the blade cylinder, said hugger belt holding the slip web against the blade cylinder with slippage prior to the separation of a slip from the slip web and not entraining the slip without slippage until after separation of the slip from the slip web, the perforating device is adjustable to the speed of the slip web in such a way that it provides transverse perforations on the slip web at intervals of a desired length of the slip, and the angle of action of the rotating tear-off segment is adjusted such that a tearing off of the slip is carried out when the blade is located precisely in a region of the front end of the slip web.

2. A device for removal of slips of material from a continuously transported slip web comprising:

an advancement roll pair which continuously advances and holds the slip web, a blade cylinder having a blade which follows a path along a surface line for pushing a respective lead end of a slip, a gripper cylinder having a gripper into which said respective lead end is pushed, and a cutter device, arranged between the advancement roll pair and the blade cylinder, for transversely cutting the slip web so that slips can be removed from the slip web, characterized in that a hugger belt is applied on a section of a periphery of the blade cylinder, said hugger belt, before separation of a slip from the slip web, holding the slip web in contact with the blade cylinder with slippage and not entraining the slip without slippage until after separation of the slip from the slip web, a speed of the advancement roll pair is adjustable to accommodate slips of different lengths between a highest speed, which is less than a peripheral speed of the blade cylinder and approximately corresponds to a speed which a web start requires, during one rotation of the blade cylinder, in order to overcome a first distance along a path traveled in the device by the slip web between the cutter device up to the blade, and a minimum speed, which approximately corresponds to the speed which the web start requires in order, during one rotation of the blade cylinder, to overcome a second distance along the path between the cutter device up to a contact point of a tear-off segment on the blade cylinder, and a time to carry out each transverse cut is adjusted such that a transverse cut in order to remove a slip is carried out when the blade is located precisely in a region of the front end of the slip web.

* * * * *